UNITED STATES PATENT OFFICE.

EUGENE S. BRADFORD, OF SPRINGFIELD, ILLINOIS.

IMPROVEMENT IN COMPOSITIONS FOR PAVEMENTS.

Specification forming part of Letters Patent No. 200,123, dated February 12, 1878; application filed November 21, 1877.

*To all whom it may concern:*

Be it known that I, EUGENE S. BRADFORD, of Springfield, in the county of Sangamon and State of Illinois, have invented a new and useful compound and process for preparing the same prior to its use in the forming of blocks, slabs, &c., or other forms of hard pavement for streets, floors, or passages, which compound and process of preparation are fully described in the following specification.

This invention relates to that class of compounds which depend upon a condition of heat and fluidity in the portion of the compound which gives coherency, or where one substance conglutinates others having no tendency otherwise to coalesce.

In the formation of my compound, take 62.50 parts of sand or silicious stone-dust, a sufficient quantity of asphaltum, 27.50 parts of finely-pulverized clinker, ferruginous cinder, or tap-hole slag. These proportions of matter I cause to combine to a remarkable degree of solidity and unshrinking hardness with but an insignificant proportion of the labor required to combine such ingredients in any other ordinary ways.

In a large iron vessel capable of holding several hundred gallons, and which is heated by fire, steam, or in any other suitable way, I fill the vessel one-third full of water, and then cause the fire or other heat to act upon the kettle, causing the water to boil. I introduce into this vessel an unproportioned quantity of asphaltum; other pitch will answer less advantageously. At a certain heat, the asphaltum or pitch will melt and form a thick ebullating scum on the surface of the water. Above the vessel I arrange a common device, through which I slowly but regularly feed the sand and the ferro-silicious matters, which are already supposed to be well mixed together.

The effect which I will now describe is more perfectly produced if the above two ingredients are well heated. They must always be perfectly dry.

The feed arrangement, on being started, should cause the sand and pulverized material to fall into the boiling-vessel with strict regularity as to quantity. If the feed is too fast, the substances falling will form cakes or lumps on the floating pitch; but if the proper quantity is caused to fall, every particle is enveloped by the hot fluid pitch, and to a certain degree becomes saturated therewith. The heavier particles gradually sink into the water underneath, and are there divested of any excess of attached pitch, the hot water causing all to separate but the absorbed or inseparable quantity which each particle will positively retain of pitch. The excess rises to its former place on the surface of the water, to be again taken down almost *ad infinitum* by succeeding grains, or until the quantity of subsided matter is so large as to interfere with the proper heating of the water.

Thus, when the largest possible quantity of matter has been pitch-coated, a similar adjacent vessel, provided with a set of cocks, will draw off all but the sedimentary matter. The body of material which remains is very nearly of the composition already stated, and is, after damping the fire, to be shoveled out conveniently to the molding-presses. The heat in the mass, when being shoveled out, is sufficient to evaporate all retained moisture.

The composition thus obtained can, as soon as dry and partially cooled, be pressed into any desired form; or portable apparatus for street operations may be in use at the point of application, the hot composition being spread and rammed or heavily rolled to a solid uniform surface, or shaped according to any prescribed configuration.

By my method of forming such compositions no more pitch is allowed to remain attached to the other ingredients than the quantity which is required to fill the interstices between the various grains composing the body of the molded form.

It is only when powerfully pressed that my block or slab is perfectly produced. Every grain and particle is then shouldered solidly against its contiguous particles, and the injurious and common liability to expansion, cracking, and shrinking of such composite substances is almost entirely overcome.

I do not herein claim any of the apparatus described as essential to the practical manipulation of my invention.

I claim as my invention—

The process herein described of saturating pulverized mineral or earthy matters with asphaltum or other agglutinating material which will float on water, by passing the pulverized mineral or earthy matter through the asphaltum into the water, whereby the surplus of asphaltum is thrown off, substantially as described, and for the purpose set forth.

In testimony that I claim the foregoing as my own invention I affix my signature in presence of two witnesses.

EUGENE S. BRADFORD.

Witnesses:
 JNO. C. LANPHIER,
 GEO. S. GEHLMEN.